US011254899B2

(12) United States Patent
Hoch et al.

(10) Patent No.: US 11,254,899 B2
(45) Date of Patent: Feb. 22, 2022

(54) MATURATION CONTAINER FOR SPIRITS AND METHOD OF CONSTRUCTING SAME

(71) Applicant: Diageo Scotland Limited, Edinburgh (GB)

(72) Inventors: Richard Hoch, New Lenox, IL (US); Brian M. Makela, Wheaton, IL (US)

(73) Assignee: Diageo Scotland Limited, Edinburgh (GB)

( * ) Notice: Subject to any disclaimer, the term of this patent is extended or adjusted under 35 U.S.C. 154(b) by 362 days.

(21) Appl. No.: 16/074,317

(22) PCT Filed: Feb. 3, 2017

(86) PCT No.: PCT/GB2017/050263
§ 371 (c)(1),
(2) Date: Jul. 31, 2018

(87) PCT Pub. No.: WO2017/137726
PCT Pub. Date: Aug. 17, 2017

(65) Prior Publication Data
US 2020/0017810 A1    Jan. 16, 2020

(30) Foreign Application Priority Data

Feb. 10, 2016 (GB) ...................................... 1602383

(51) Int. Cl.
*C12H 1/22* (2006.01)
*B65D 65/38* (2006.01)
(Continued)

(52) U.S. Cl.
CPC ............... *C12H 1/22* (2013.01); *B65D 65/38* (2013.01); *B65D 85/72* (2013.01); *C12H 1/12* (2013.01)

(58) Field of Classification Search
CPC .............. B65D 90/022; B65D 23/0871; B65D 23/0842; B65D 23/00; B65D 21/0231;
(Continued)

(56) References Cited

U.S. PATENT DOCUMENTS 2,865,770 A   12/1958   Nickol
2,943,940 A    7/1960   Wiedmann
(Continued)

FOREIGN PATENT DOCUMENTS

AU    7158974       1/1976
AU    2008100043    2/2008
(Continued)

OTHER PUBLICATIONS

Majid Jamshidian et al: "Poly-Lactic Acid: Production, Applications, Nanocomposites, and Release Studies", Comprehensive Reviews in Food Science and Food Safety, vol. 9, No. 5, Sep. 26, 2010 (Sep. 26, 2010), pp. 552-571.

(Continued)

*Primary Examiner* — Kareen K Thomas
(74) *Attorney, Agent, or Firm* — Stephen T. Scherrer; Monique A. Morneault; Scherrer Patent & Trademark Law, P C.

(57) ABSTRACT

A maturation container and method of maturing spirits that incorporates a polymeric material (10) into a wall of the container. The material (10) is preferably Polylactic Acid (PLA) which has known oxygen permeation properties suited to maturation but is substantially impermeable to ethanol. Use of such a material is proposed to supplement or replace traditional wooden barrel methods of storage.

8 Claims, 1 Drawing Sheet

(51) Int. Cl.
*B65D 85/72* (2006.01)
*C12H 1/12* (2006.01)

(58) Field of Classification Search
CPC ........ B65D 11/04; B65D 65/38; B65D 85/72; A47G 19/22; A47G 19/2205; A47G 19/2222; A47G 19/2227; A47G 19/2272; C12H 1/22; C12H 1/12; C12G 3/07
See application file for complete search history.

(56) References Cited

U.S. PATENT DOCUMENTS

| | | | | |
|---|---|---|---|---|
| 9,296,550 | B2* | 3/2016 | Smith | B65D 83/38 |
| 10,195,122 | B2* | 2/2019 | Tan | A61K 8/891 |
| 10,426,979 | B2* | 10/2019 | Birkel | A61K 8/046 |
| 2004/0105941 | A1* | 6/2004 | Terada | B65D 3/22 |
| | | | | 428/34.2 |
| 2010/0155396 | A1* | 6/2010 | Warner | B65D 1/0215 |
| | | | | 220/4.24 |
| 2013/0045300 | A1 | 2/2013 | Robillard | |
| 2013/0068243 | A1* | 3/2013 | Birkel | A61Q 5/06 |
| | | | | 132/210 |

FOREIGN PATENT DOCUMENTS

| | | |
|---|---|---|
| WO | WO0128889 | 4/2001 |
| WO | WO200502114 | 6/2005 |
| WO | WO2015010015 | 1/2015 |
| WO | WO2015042647 | 4/2015 |

OTHER PUBLICATIONS

T. Jin et al: "Biodegradable Polylactic Acid Polymer with Nisin for Use in Antimicrobial Food Packaging", Journal of Food Science, vol. 73, No. 3, Feb. 28, 2008 (Feb. 28, 2008), pp. M127-M134.
http://www.environmentalleader.com/2010/03/08/bio-plastic-water-bottles-trickle-into-marketplace/ [Available online Mar. 8, 2010] Gina Roos,. "100% bio-plastic water bottles trickle into the marketplace".

* cited by examiner

MATURATION CONTAINER FOR SPIRITS AND METHOD OF CONSTRUCTING SAME

The present invention relates to a maturation container intended for storing spirit beverages prior to bottling and distribution. Particularly, a wall of the container must have the property of being oxygen permeable while preventing loss of the spirit, i.e. ethanol, itself. The preferred material for incorporation into a vessel wall to achieve desirable barrier characteristics according to the invention is a polymeric material, e.g. polylactic acid (PLA).

BACKGROUND TO THE INVENTION

The most common form of maturation vessel in the spirit industry is a barrel made from wood. Barrels are typically constructed from a number of staves bound together tightly as a means of forming a sealed container. It is well known that some oxygen permeates through the wood/joins which is required for the maturation process. Unfortunately, it is also known that a volume of the liquid, including the alcohol, is lost through wooden barrel walls over time which is a direct commercial loss.

While wooden barrels are the preferred form of maturation container for many spirits and, in fact, may be prescribed/regulated as essential in some cases depending on the class of spirit, such barrels are expensive and often inconsistent in the results they produce. The chemistry and properties of the wood cannot be precisely determined which leads to uncertainty about performance. This is particularly a problem when barrels are stored for a long period of time, e.g. ten years or more.

It is well known that wood is a finite resource and it would be preferable to find an alternative for barrel construction if the resultant spirit product to be bottled and distributed is otherwise equivalent.

Various plastics are known to have a degree of oxygen permeability and have been used as part of maturation methods and apparatus. For example, WO03/022983 describes a device where a polymeric tube is placed into a container of wine for the purposes of slowly delivering oxygen under pressure through the tube wall overtime. However, such a system is not known to be employed for spirit maturation.

WO2015/042647 suggests a rotationally moulded HDPE bulk fluid container that can be used for maturing wine. However LDPE, HDPE, PP and other known container plastics are not considered suitable for products with sensitive flavours like those in spirits.

WO2015/010015 describes a process of covering a wooden barrel with an olefin film to reduce evaporative loss of alcohol during maturation. The film is applied to an existing wooden barrel and does not suggest manufacture of a new maturation vessel. Furthermore, moisture evaporated from or leaking through the barrel and trapped against it by the film will likely cause degradation so that the barrel and film may not be reusable.

Various plastics materials are known for liquid and beverage storage. For example, water bottles are commonly formed from PET, but other materials are known such as polylactic acid (PLA), adopted because it can be produced from renewable resources and has the ability to be composted. However, such materials are not known for use in the field of aging spirits.

SUMMARY OF THE INVENTION

The present invention seeks to provide an alternative material for a maturation vessel, or at least as part of one of the walls of said vessel, to be used as an alternative to traditional wooden barrels. The advantage of such an invention is to reduce the overall cost, to provide more control over the properties of the wall for maturation purposes, and to reduce evaporative loss of alcohol.

In a broad aspect of the invention there is provided a maturation container according to claim 1. The container is suitable for maturing spirits and includes a wall made from or incorporating a layer of polylactic acid (PLA) material that is now understood according to the invention to have suitable oxygen permeation properties while being substantially impermeable to ethanol.

The container wall may or may not have water permeable properties. This aspect is less critical since water can be replaced relatively cheaply at the bottling stage, compared to the cost of lost spirit.

It has been observed that, for a typical 53 gallon wooden barrel having an inner surface area of 2980 sq. in. (19226 $cm^2$), a 3 to 5% total liquid loss can be expected in the first year followed by about 3% loss in subsequent years. The loss is a combination of water and ethanol with a little more water lost than ethanol as it is noted there is a gain of about 0.5% ABV per year. Depending on the distillate type (rum, whiskey etc.) this equates to about 5 to 10 kg of liquid loss per year per barrel although it is accepted that these numbers are dependent on storage conditions, temperature and humidity.

As stated above, water loss is not a significant problem since it is replaced easily and cheaply. In fact, having water transport in the side wall promotes the extraction of flavours as some water will enter the side wall and then return to the liquid. Accordingly, a range of acceptable water loss can be roughly derived as between about 0.083 mg $H_2O/cm^2$ of barrel contact surface per day and 0.64 mg $H_2O/cm^2$ of barrel contact surface per day.

According to the invention, zero permeation of alcohol is most desirable but some loss can be tolerated, especially if it is better than current methods by a reasonable factor, e.g. a 25% improvement could render the invention commercially viable, given the value of the lost alcohol. This equates to a maximum permissible loss of about 0.32 mg $EtOH/cm^2$ of barrel contact surface per day.

The invention resides in the selection of polylactic acid (PLA) for spirit maturation purposes, which is surprisingly effective. A layer of this material incorporated into a maturation container wall is able to provide a known level of oxygen permeation while being substantially impermeable to ethanol.

PLA has been used as a material for making plastic water bottles in the past due to its inert qualities (i.e. has little influence on flavour for the beverage stored within the bottle). However, it transpired that over a relatively short period of time, PLA provides a poor barrier to water and, as such, an unacceptable volume of water is lost, e.g. about 0.25 g water loss per day in a 500 mL container with a wall 0.46 mm thick.

Accordingly, it is believed that PLA has mostly been abandoned as a material for the construction of water bottles or other liquid because of high water loss which leads to the bottles "panelling", a condition where the sides deform inwardly.

The fact that PLA happens to have oxygen permeability, as required for spirit maturation, and has been unexpectedly discovered to provide an excellent barrier to ethanol makes it suited for a role in maturation containers.

PLA for spirit maturation could form the entire container, one or more walls and/or be laminated/blended as a layer in a greater superstructure. The material may lend itself to "bag-in-box" applications where a rigid framework supports a relatively thin-walled bag structure according to the invention.

Preferably the walls of the container will be opaque.

In a second broad aspect of the invention according to claim 9 there is provided a method of maturing spirits including providing a container with a wall incorporating PLA. PLA has surprisingly been found to have oxygen permeation properties suitable for maturation and is substantially impermeable to ethanol.

Furthermore, both a container and method according to the invention may result in accelerated maturation, such that an improved taste can be achieved in a shorter timeframe compared to a traditional wooden barrel.

DETAILED DESCRIPTION OF THE INVENTION

Figure 1:
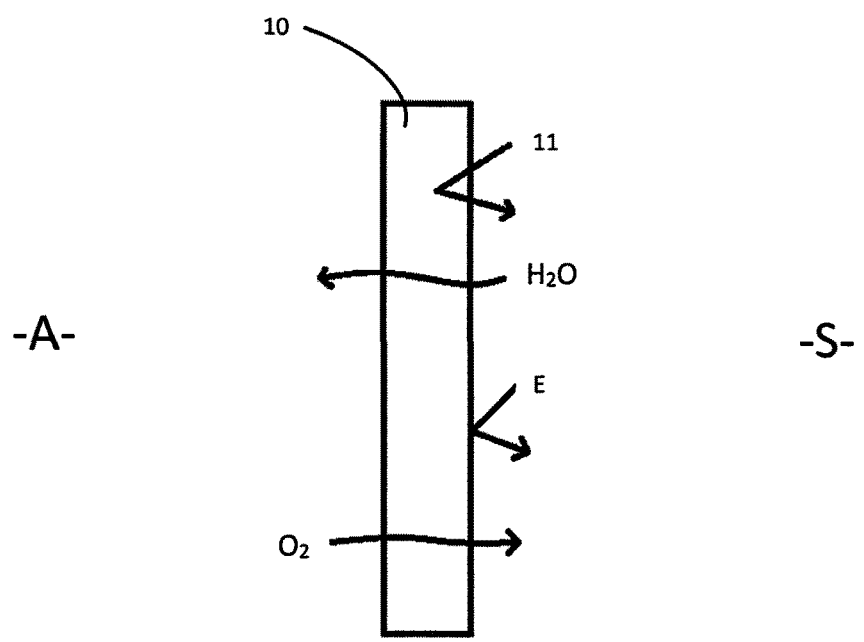
FIG. 1 illustrates a schematic view of a maturation vessel wall material according to the invention indicating various permeability properties.

FIG. 1 shows a layer of polymer material that may substantially form or be incorporated into the wall of a container for maturing spirits. The particular example of material 10 is an injection stretch blow-moulded PLA material. Other injection moulded alternatives are possible, e.g. to achieve thicker walls with less crystallinity. The left side of the material, denoted "A" represents the outside atmosphere of a storage space where the container would be located, e.g. 78% nitrogen, 21% oxygen and 1% other atmospheric gases. The right side of the material 10 is generally denoted "S" which is the spirit resident within the container.

The spirit S may be any known alcoholic beverage variant, such as rum or tequila. The invention may be capable of being utilised with any spirit industry, although regulations and tradition may dictate that a container must be substantially built from a particular material, e.g. wood. Nevertheless, the invention may be incorporated into a more conventional vessel such as a wooden barrel as a layer or, indeed, the polymer itself could have wood fragments impregnated therein in order to impart particular flavour characteristics. Conventional bottles made from PLA are typically injection stretch blow molded (ISBM); in the case of a larger scale maturation application it is expected that containers could be made using IBM (injection blow molding), EBM (extrusion blow molding), rotational molding, or other methods like thermoforming.

An arrow denoted $O_2$ shows a certain permeability to oxygen passing through the barrier 10. Oxygen permeability characteristics for a PLA wall material are known and/or can be determined by experiment and tabulated. These characteristics can be tailored (by controlling thickness and/or formulation) to provide an oxygen permeable barrier that is suitable for maturation of a particular spirit S.

In the case of PLA being used as the barrier material 10 it is also expected that water, denoted by an arrow $H_2O$, would pass through wall 10 and evaporate into the atmosphere. Water loss is not a significant problem since this can be easily addressed by suitable supplementation during the bottling process in order to adjust for required ABV. Alternative formulations may improve, i.e. reduce, water loss denoted by arrow 11. By contrast, if desirable, it may be possible to increase water loss, without corresponding loss of alcohol, as a means of concentrating the product.

According to the invention, it is necessary to substantially prevent loss of ethanol, which is denoted by arrow E in FIG. 1. PLA is now known, unexpectedly, to provide such a barrier, while allowing oxygen and a proportion of water to pass therethrough.

Table 1 below shows the results of water loss for a prior art PLA water bottle at ambient temperature with the following specifications:

Weight=25 g
Height=18 cm
Diameter=6.5 cm
Average wall thickness=0.46 mm
Surface area below neck (estimated)=427 $cm^2$

TABLE 1

| Days | Water (g) | Total Loss, Water (g) | Water Running Avg Daily Loss (g) |
|---|---|---|---|
| 0 | 530.2 | 0.0 | 0 |
| 7 | 528.6 | 1.6 | 0.23 |
| 14 | 526.8 | 3.4 | 0.24 |
| 21 | 525.0 | 5.2 | 0.25 |
| 28 | 523.2 | 7.0 | 0.25 |
| 35 | 521.5 | 8.7 | 0.25 |
| 42 | 519.6 | 10.6 | 0.25 |
| 50 | 517.4 | 12.8 | 0.26 |
| 56 | 515.9 | 14.3 | 0.26 |
| 63 | 514.1 | 16.1 | 0.26 |

Figure 2:
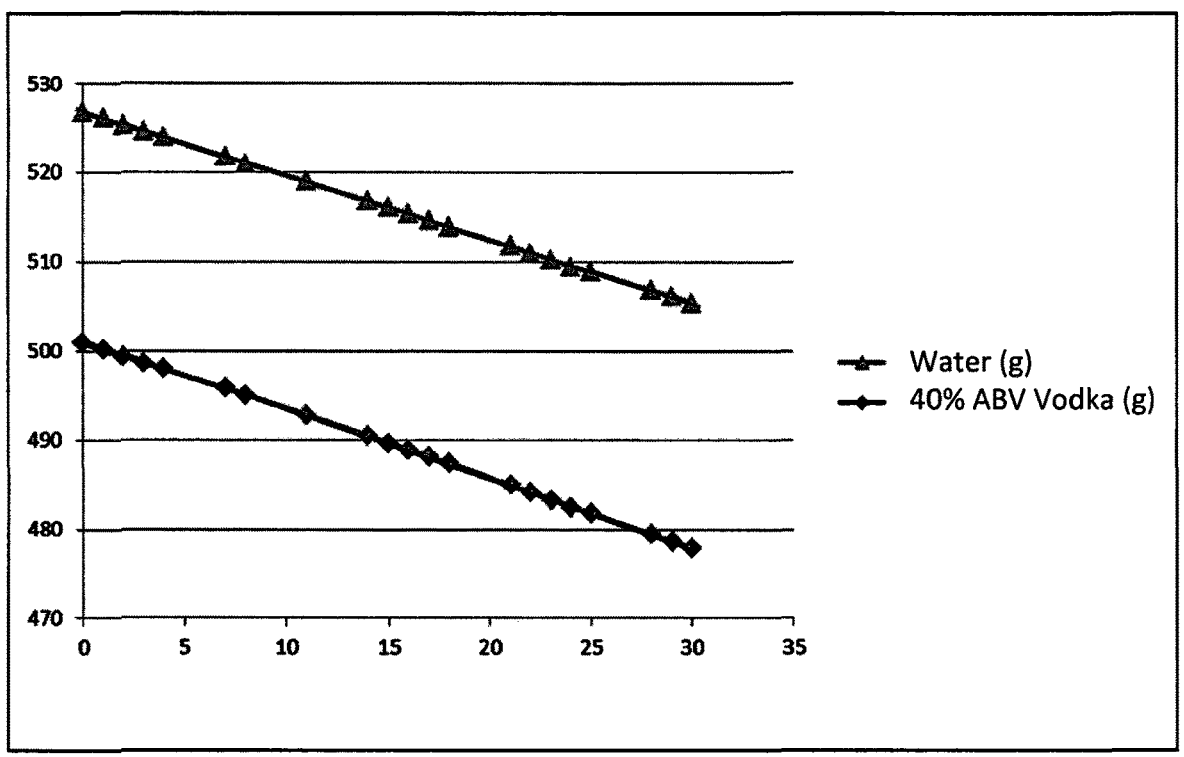
FIG. 2 shows a comparison of water loss in a control and vodka sample.

FIG. 2 shows a comparison of water loss over time for a control water content and a 40% ABV vodka. It will be apparent that both containers show a consistent fluid loss as time passes. However, in the case of the vodka it was found that all fluid loss could be attributed to water because the ABV increased over time. For example, the initial ABV was measured at 39.7% and, after thirty days, was 41.5%. Both tests were conducted under accelerated conditions at 40° C. whereas the results in Table 1 come from an experiment conducted at ambient temperature over 60 days. In both cases the closures were foil lined in order to be impermeable.

Experiments have shown that PLA has a comparable oxygen transmission rate compared to wooden barrels. For example, wine matured in French oak barrels will receive 15-45 mg $O_2$/L per year (source: "Oak Stave Oxygen Permeation: A New Tool to Make Barrels with Different Wine Oxygenation Potentials", Journal of Agricultural and Food Chemistry, January 2015) whereas PLA has an oxygen transmission rate (OTR) of approximately 19.2 mL of $O_2$/L per month. This corresponds to 329 mg $O_2$/L per year but, of course, is dependent on thickness and other attributes such as crystallinity and orientation. It is broadly desirable that the OTR would be greater than about 250 mg $O_2$/L per year for maturation purposes. In terms of oxygen transmission that takes into account material thickness, the reported permeation rate for the PLA used according to the examples herein is 675 cc–mil/$m^2$–day-atm. This material gives satisfactory results and so the desirable range of oxygen transmission is likely in the range 650 to 750 cc–mil/$m^2$–day-atm. For comparison HDPE is reportedly 3100 cc–mil/$m^2$–day-atm.

Also for contrast, an average OTR for a 500 mL PET container is approximately 0.040 mL $O_2$/package per day or 0.11 PPM of $O_2$/package per day. PLA is approximately 9 times more permeable to oxygen than PET, i.e. 0.32 mL (0.91 ppm) $O_2$/package per day for a 500 mL bottle.

For reference, prior art document WO03/022983 describes a rate of oxygen being dissolved into wine, through a polymer tube, in the range of 1-100 mL/L of wine per month.

Table 2 below provides comparative sensory results for rum in three maturation containers, i.e. a glass blind control, PLA (invention) and PET. The liquid was 75% ABV and 1.5 grams American oak large heavy toast wood chips were deposited in each container. Storage was 3 months at 40° C.

TABLE 2

| Sample | Mean DFC Score | Panelist 1 | Panelist 2 | Panelist 3 | Panelist 4 | Panelist 5 | Panelist 6 |
|---|---|---|---|---|---|---|---|
| Blind Control - Glass | 9.3 | 10 | 9 | 8 | 10 | 9 | 10 |
| PLA | 6.0 | 6 | 6 | 6 | 5 | 7 | 6 |
| PET | 9.7 | 9 | 10 | 10 | 9 | 10 | 10 |

The PLA container is notably distinguished from the control and PET containers. In general, based on panellist comments (not shown), the taste is considered improved, concluding that the liquid has changed (matured) in a PLA container while no significant change was observed in the PET or glass. In the context of the experiment a low score is desirable as this shows a variation from the glass control.

Table 3 below provides comparative sensory results for tequila distillate in three maturation containers, i.e. a glass blind control, PLA (invention) and PET. The liquid was 55% ABV and 1.5 grams American oak large heavy toast wood chips were deposited in each container. Storage was 3 months at 40° C.

TABLE 3

| Sample | Mean DFC Score | Panelist 1 | Panelist 2 | Panelist 3 | Panelist 4 | Panelist 5 | Panelist 6 |
|---|---|---|---|---|---|---|---|
| Blind Control - Amber Glass | 10.0 | 10 | 10 | 10 | 10 | 10 | 10 |
| PLA | 5.5 | 5 | 6 | 3 | 7 | 6 | 6 |
| PET | 8.3 | 8 | 8 | 8 | 8 | 10 | 8 |

Again, the PLA container is notably distinguished from the control and PET containers. The liquid has changed (matured) in a PLA container while less change was observed in the PET or glass.

The PLA containers of the rum and tequila experiments respectively also exhibited an increase in ABV over the three month test period. Since water, but not alcohol, permeates through the PLA wall there was a predictable and measurable ABV increase of 76 to 80% for rum and 54 to 58% for tequila. This simply illustrates that there is an ABV gain across multiple spirit types.

Polymer formulation is a well-established field and it is expected that the PLA properties can be adapted into a suitable container for larger scale spirit maturation for pilot plant and/or full production purposes. PLA could be incorporated as a blended polymer wall, a layer within a laminate, and/or as part of a more conventional cask design. Furthermore, it is foreseen that desirable properties (taste profile etc.) from traditional methods, e.g. wooden barrels, could be incorporated into a polymer layer, such as by impregnating wood dust or generally inserting fragments into the bottle or container. Charred oak/compound oak could be incorporated into a PLA sheet or otherwise moulded/formed into a bag for a bag-in-box application.

Once aware of the nature of invention, conventional experimental and manufacturing techniques can be used to optimise and implement the invention as outlined in the appended claims.

The invention claimed is:

1. A maturation container for spirits, the maturation container including a wall incorporating polylactic acid (PLA) wherein the wall of the container must have a property of being oxygen permeable while preventing loss of the spirit.

2. The container of claim 1 wherein PLA is incorporated as a layer within a laminate wall or as a plastic blend thereof.

3. The container of claim 1 wherein wood fragments, charred wood fragments and/or dust are incorporated within the container or upon/within the wall thereof.

4. The container of claim 1 wherein PLA material forms a flexible wall supported by a rigid superstructure.

5. The container of claim 1 wherein PLA is formed in a layer incorporated with a wooden cask wall.

6. The container of claim 1 wherein the oxygen transmission rate of the wall is above 650 cc–mil/m$^2$–day–atm.

7. The container of claim 1 wherein water permeability of the wall is in the range of 0.083 mg/cm$^2$ to 0.64 mg/cm$^2$ of barrel contact surface per day.

8. The container of claim 1 wherein ethanol permeability of the wall is below 0.32 mg/cm$^2$ per day.

* * * * *